Nov. 26, 1940.   L. E. LA BRIE   2,222,848
BRAKE
Filed Nov. 22, 1937   3 Sheets-Sheet 2

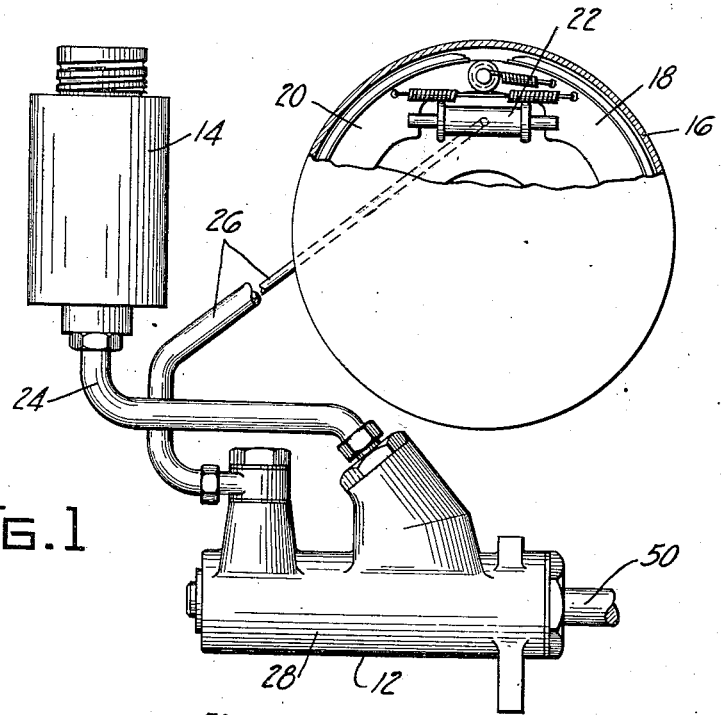
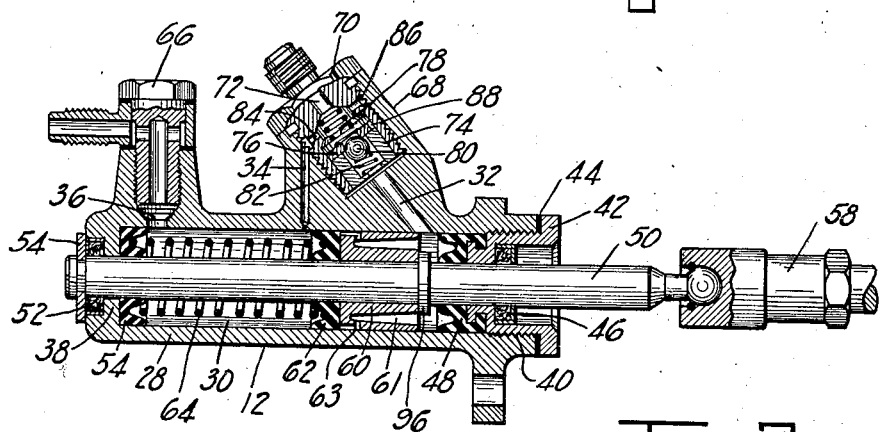

INVENTOR
LUDGER E. LA BRIE
BY
Jerome R. Cox
ATTORNEY

Patented Nov. 26, 1940

2,222,848

UNITED STATES PATENT OFFICE 2,222,848

BRAKE

Ludger E. La Brie, Detroit, Mich., assignor to Bendix Aviation Corporation, South Bend, Ind., a corporation of Delaware Application November 22, 1937, Serial No. 175,785

4 Claims. (Cl. 60—54.6)

This invention relates to brakes and more particularly to hydraulic brake systems.

An object of the invention is to provide a hydraulic system in which positive pressure is maintained on the return stroke of the piston to prevent the sucking of air into the system.

Another object is to provide a hydraulic brake system with a master cylinder which acts as a pump to fill the system with liquid.

Another object is to provide a hydraulic brake system which is amply compensated for changes in temperature and leakage.

Further objects and desirable particular constructions will be more apparent upon reference to the following detailed description of several embodiments illustrated in the accompanying drawings, in which:

Figure 1 is a diagrammatic view showing a brake system constructed according to my invention;

Figure 2 is a vertical longitudinal section through the master cylinder and part of the reservoir of my novel brake system;

Figure 3:
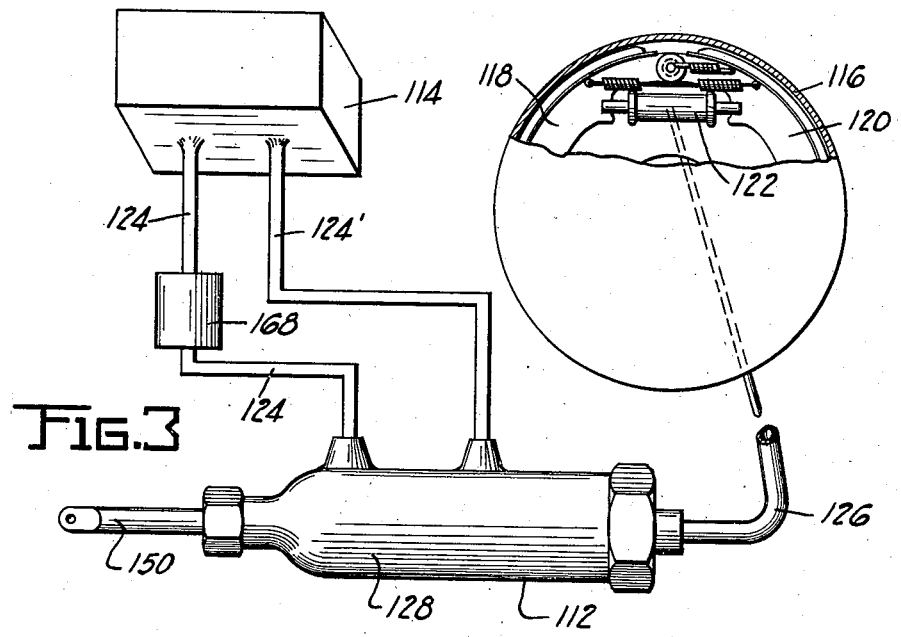
Figure 3 is a view similar to Figure 1 of a modified form of my invention.

Referring particularly to Figures 1 and 2 of the drawings there is disclosed a brake system including a master cylinder 12, a supply reservoir 14, a brake drum 16, brake shoes 18 and 20 and a fluid motor or wheel cylinder 22. The master cylinder is connected with the reservoir 14 through a conduit 24 and with the wheel cylinder 22 through a conduit 26.

The master cylinder 12 comprises a main casting 28 formed with a main bore 30 and with intersecting bores 32, 34, and 36. The bore 30 extends through the rearward end of the casting 28 but does not extend through the forward end 38 thereof. The rearward end of the bore is threaded internally as at 40 and is provided with an annular plug 42 which normally serves to seal the rearward end of the cylinder. The plug 42 has associated therewith packings 44, 46, and 48 which aid in sealing the rear end of the cylinder. Sliding through the opening in the plug 42 and contacting with the packings 46 and 48 is a piston rod 50 which serves to transmit force from the pedal to the piston.

Surrounding the piston rod 50 and contacting with a shoulder 96 formed thereon is the master piston 60 which has associated therewith an annular cup packing 62. The piston rod extends forwardly through an opening in the forward end 38 of the cylinder and is sealed against leakage by packings 52 and 54. A spring 64 interposed between the packings 54 and 62 serves to maintain them in contact with the forward end 38 of the cylinder and the piston 60 respectively and also serves to return the piston 60 to its normal position as shown. A split washer 54 secured on the projecting end of the piston rod 50 serves to determine the release position of the piston and piston rod by engaging the front end of the casting 28.

Force applied to the pedal (not shown) acts through a fitting 58 universally secured to the piston connection 50 to force the piston 60 forward and thus to force liquid from the master cylinder to the brakes. Thus adjacent the front end of the casting, the fitting 66 is threaded into the bore 36 and has secured on its outer end the conduit 26.

Liquid is supplied to the master cylinder from the reservoir 14 through the conduit 24. It is desirable that there shall be a free interchange of liquid between the reservoir and the master cylinder when the master cylinder piston is in its normal position (as shown) and that substantially free passage of liquid may be allowed from the reservoir to the master cylinder at all times, but it is also desirable that relatively high pressures shall be maintained upon the liquid during operation of the brake without allowing any portion thereof to return to the reservoir during operation of the brake. Moreover, it is desirable that relatively high pressures should be developed upon the liquid rearwardly of the piston while the brake is being released and while the piston is moving rearwardly. Therefore, I have provided a double acting check valve 68 which is positioned to control the flow of liquid through the bore 32 and which is by-passed by the bore 34. The valve 68 comprises a plug 70 connected at its outer end to the conduit 24 and threaded into an enlarged portion of the bore 32. The plug is formed with a central concentric stepped bore 72 and is provided with a sleeve 74 positioned therein adjacent the inner end. A washer 76 is urged by a spring 78 to contact with the outer end of the sleeve 74. A ball check 80 is urged by relatively weak spring 82 to contact with the washer 76. A transverse bore 84 intersects the bore 72 and connects with an annular groove 86 which registers with the bore 34.

The piston 60 is formed with an annular groove 61 and is provided with a series of ports such as 63 leading from the groove 61 to the rear face of the packing cup 62.

The washer 76 in addition to its central opening 77 is provided with a plurality of small openings 88 through which liquid may pass outward from the master cylinder when the washer 76 is lifted from its seat by pressure exceeding the strength of the spring 78.

Pressure exerted upon the pedal operates through the fitting 58 to move the piston 60 forward. This forces the liquid in the master cylinder in front of the piston 60 through the fitting 66 and the conduit 26 to the wheel cylinder 22 to spread the shoes 18 and 20 to contact with the drum 16 and thus causes the shoes to anchor upon the anchor 21. When the pedal is released the spring 64 moves the piston 60 rearwardly until the pressure reaches the value of the spring 78. Should there be a tendency to develop a vacuum in the master cylinder in advance of the piston 60, the liquid rearwardly of the piston will be forced by the pressure through the ports 63 past the annular packing cup 62 to eliminate the vacuum. As soon as the piston 60 has reached the inactive position shown (which is determined by the engagement of the washer 54 with the front of the cylinder substantially free interchange of liquid between the reservoir 14 and the front portion of the master cylinder is allowed by reason of the bore 34, the groove 86, the bores 84, the bore 72, and the conduit 24.

Figure 4:
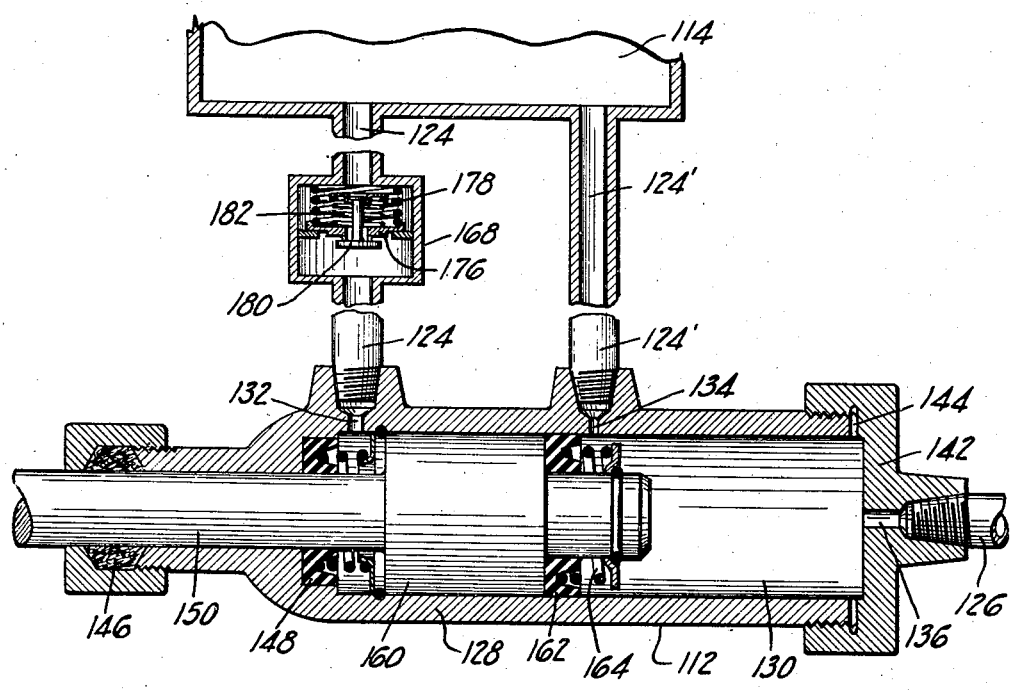
Figure 4 is a view similar to Figure 2 of the modification of Figure 3.

The modification shown in Figures 3 and 4 is substantially the same in construction and operation and I have designated corresponding parts therein by the same reference numeral.

In this modification the piston 160 is solid and is somewhat loosely fitted to permit fluid to flow forward (to the right) past it, the packing 162 acting as a check valve to prevent return flow.

The check valve arrangement 168 is not built into the casting 128 but is provided separately in the conduit 124, and a second conduit 124' is provided to conduct fluid from the reservoir to the compensating port 134.

Figure 5:
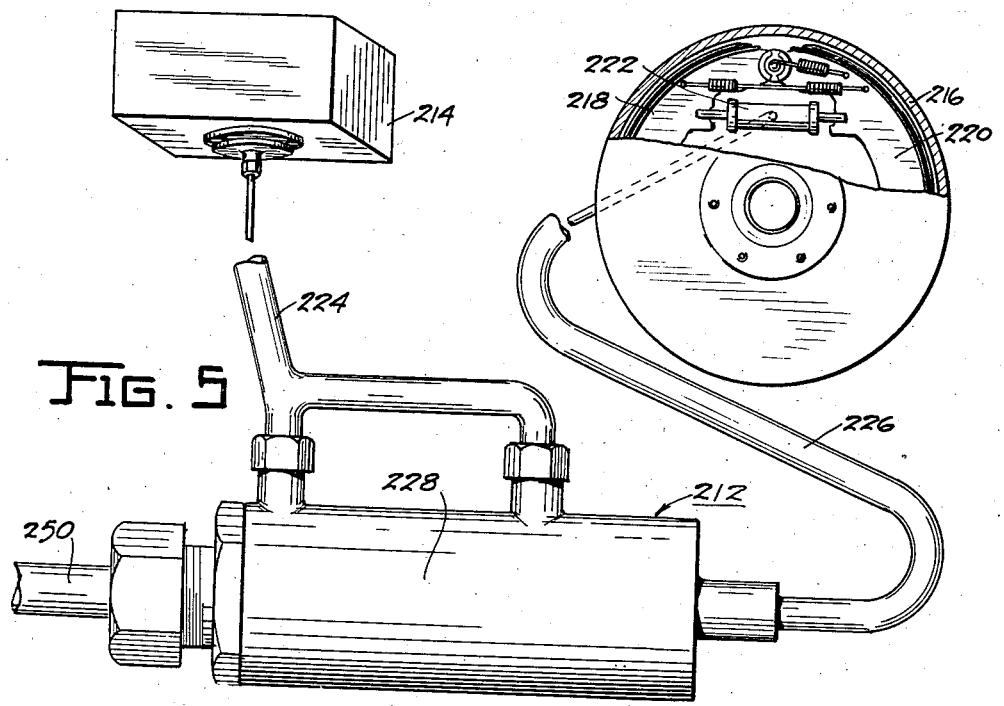
Figures 5 and 6 are views corresponding to Figures 1 and 2 of still another modification of my invention.
Figure 6:
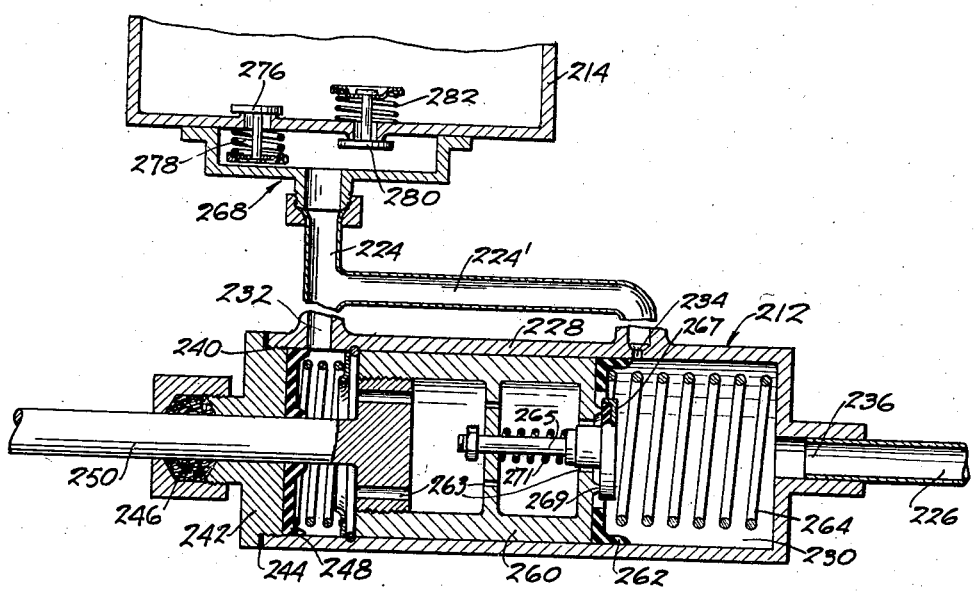

In the modification of Figures 5 and 6, I have used the same reference numerals to designate parts corresponding to parts of Figures 1 and 2 plus 200.

In this modification the check valve arrangement 268 consists of two separate oppositely-acting check valves 276 and 280 positioned in the bottom of the reservoir 214, and communicating with the conduit 224.

A branch conduit 224' extends from the conduit 224 to the compensating port 234 so that in this modification I do not have atmospheric compensation, but, instead, excess fuel is discharged at the pressure of the spring 278 thus maintaining pressure in the system at all times.

The piston 260 is hollow and is pierced from front to rear by ports 263, the port in the forward wall being rather large and centrally positioned.

In this port is loosely fitted the stem of a valve 65, having a sealing member 67 seating on an annular rim 69 formed on the front face of the piston 260. This valve is held open by a light spring 71 and closes when the piston is moved forwardly because of the increase in pressure but opens to permit fluid to flow from the rear of the piston to the front thereof when the piston is released.

The operation of this modification should be easily understood in connection with the description of the preceding embodiments.

This application is a continuation in part of a copending application Serial No. 661,613 filed March 18, 1933 by myself jointly with Joseph R. Heidloff, and issued as Patent No. 2,140,751 on Dec. 20, 1938.

While three embodiments of my invention have been described in detail, it is not my intention to be limited to those embodiments, or otherwise than by the terms of the appended claims.

I claim:

1. In a liquid pressure mechanism, a cylinder, a piston reciprocable therein, means forming a liquid containing chamber at the rear of the piston the volume of which varies with the piston movement, said piston being provided with means preventing liquid from passing the piston on its forward stroke but permitting such passage on the return stroke, a reservoir, valve means for admitting liquid to the chamber from the reservoir on the forward stroke of the piston, and valve means permitting liquid to flow from the chamber to the reservoir when the piston during its return stroke applies a predetermined pressure to the liquid in the chamber.

2. In a liquid pressure mechanism, a compression cylinder, a piston reciprocable therein for alternately creating superatmospheric pressure and subatmospheric pressure in said cylinder, means permitting flow of fluid past the piston in one direction only, a chamber forming a seal for preventing leakage of air past said piston during the return stroke thereof, a fluid reservoir, a single connection between said fluid reservoir and said seal, a second connection between said fluid reservoir and that part of said cylinder in front of said piston, valve means for admitting liquid to the chamber from the reservoir on the forward stroke of the piston, and valve means permitting liquid to flow from the chamber to the reservoir when the piston during its return stroke applies a predetermined pressure to the liquid in the chamber.

3. In a fluid pressure mechanism, a cylinder, a piston reciprocable therein, a reservoir, means forming a passage between the reservoir and the cylinder, said passage being uncovered by the piston in its retracted position, a fluid containing chamber at the rear of the piston the volume of which varies with the piston movement, means forming a passage between the reservoir and the chamber, means permitting fluid to flow from said chamber past the piston on its return stroke, valve means for admitting liquid to the chamber from the reservoir on the forward stroke of the piston, and valve means permitting liquid to flow from the chamber to the reservoir when the piston during its return stroke applies a predetermined pressure to the liquid in the chamber.

4. In a liquid pressure mechanism, a cylinder, a piston reciprocable therein, means forming a liquid containing chamber at the rear of the piston the volume of which varies with the piston movement, said piston being provided with means preventing liquid from passing the piston on its forward stroke but permitting such passage on the return stroke, a reservoir, valve means between the reservoir and the chamber, and resilient elements of different strength exerting force in opposite directions against the valve means.

LUDGER E. LA BRIE.